United States Patent Office 3,457,655
Patented July 29, 1969

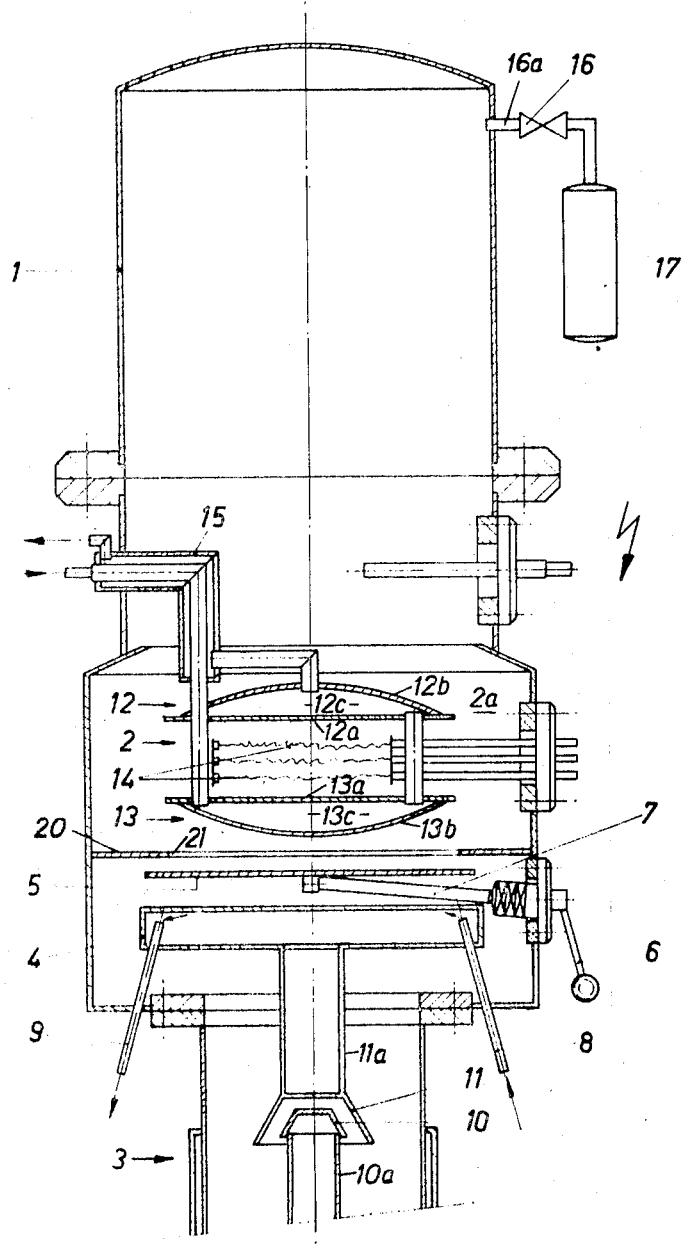

3,457,655
PROCESS OF AND APPARATUS FOR THE DESORPTION OF EXTRANEOUS MOLECULES
Otto Winkler, Balzers, Helmut Reisinger, Triesen, and Jochen Ruhe, Triesen-Maschlina, Liechtenstein, assignors to Balzers Patent- und Lizenz-Anstalt, Balzers, Liechtenstein
Filed Oct. 16, 1967, Ser. No. 675,584
Claims priority, application Switzerland, Oct. 18, 1966, 15,147/66
Int. Cl. F26b 5/04, 21/10; B01d 5/00
U.S. Cl. 34—15                                   8 Claims

ABSTRACT OF THE DISCLOSURE

A method of desorbing extraneous vapor molecules from the inner wall of a vessel adapted for use as a vacuum chamber, comprised of the steps of heating the inner wall of the vessel, flowing a gas through the vessel, removing the gas by means of a diffusion pump after its passage over the inner wall of the vessel, providing an adjustable throttle point through which the gas flows from the vessel to the pump, and adjusting the throttle point whereby the pressure gas within the vessel is maintained at a considerably higher value than at the intake of the pump.

An apparatus for desorbing extraneous vapor molecules from a wall surface formed of a vessel having an inner wall, inlet means for supplying a gas, such as argon, into the vessel, the gas being characterized in that it has only a slight tendency to be sorbed into the inner wall. A diffusion pump is connected to the vessel for withdrawing the gas after its passage over the inner wall of the vessel and an adjustable throttling device is disposed in a flow path of the gas between the vessel and the diffusion pump for regulating the pressure of the gas in the vessel at a considerably higher value than at the intake to the pump.

Summary of the invention

The present invention is directed to a method of and apparatus for the desorption of extraneous molecules from the inner wall of a vessel adapted to be used as a vacuum chamber, and more particularly, it is concerned with the combined use of a diffusion pump for withdrawing gas from the vessel combined with a throttling device to prevent the flow of propellant vapor molecules into the vessel during the removal of extraneous molecules.

The desorption of extraneous molecules from the inner wall of a vessel employed as a vacuum chamber can be accomplished by purging the vessel with gases which have little tendency to be sorbed by the inner walls. In such an arrangement the purge gas is normally introduced into the vessel at its upper end and is removed by pumping to assure a continuous flow over the inner wall of the vessel. When this purging process is carried out at a low temperature, as is necessary in the preparation of a vessel for subsequent use as an ultra-high vacuum chamber, a high vacuum diffusion pump is utilized for withdrawing the gas. However, using such a diffusion pump has the disadvantage that it permits propellant vapor molecules to flow back into the vessel where they tend to be sorbed in the inner wall. To limit the back flow of propellant vapor molecules, cooled propellant traps have been placed between the vessel and the pump, the traps usually consist of several catch plates successively disposed in the path of the propellant vapor molecules to prevent their passage directly into the vessel. Though such traps are effective to a degree, a certain amount of propellant vapor molecules still find its way into the vessel due to the collision of the molecules in space, and once within the vessel the molecules become deposited on the inner wall.

Accordingly, the present invention is directed to the problem of removing extraneous molecules which adhere to or are absorbed into the inner wall of the vessel and preventing any flow of propellant vapor molecules back into the vessel whereby the vessel can be employed as an ultra-high vacuum chamber or to carry out processes which require an extremely pure gas atmosphere. During the preparation of the vessel, while it is being heated and purge gas is being circulated through it, all propellant vapor flow from the diffusion pump into the vessel must be prevented.

Therefore, the primary object of the present invention is to provide both a method and apparatus for removing extraneous molecules from the inner wall of the vessel employing a diffusion pump and at the same time preventing any back flow of the propellant vapor molecules into the vessel.

The present invention relates to a process for the desorption of extraneous molecules from the inner walls of a vessel, particularly where the vessel is to be employed as an ultra-high vacuum chamber. Initially the inner wall of the vessel is heated and, at the same time, a gas having little tendency to be absorbed into the inner wall is introduced into the vessel and flows through it being continuously withdrawn by a diffusion pump. In the connection between the vessel and the diffusion pump an adjustable throttle point is established whereby the pressure of the gas within the vessel is maintained at a considerably higher value than at the intake side of the pump. specifically, during the heating of the vessel the throttle point is adjusted so that the flow velocity of the gas through it is greater than the velocity with which propellant vapor molecules can diffuse through the gas into the vessel.

In accordance with the above step for establishing the flow velocity of the gas at the throttle point, a surprising reduction in the back flow of propellant vapor molecules takes place. The flow of the vapor molecules is reduced to such small values that it can no longer be determined even with extremely sensitive mass spectrometers. The correct adjustment of the throttling point can be ascertained by plotting the flow values of the propellant vapor molecules into the vessel, established by means of an indicator, as a function of the opening at the throttle point and ascertaining the specific arrangement of the throttle point (where the opening in the throttle device is reduced gradually) at which a sudden drop in the back flow occurs. For this purpose a flow of gas into the vessel should be selected so that down stream of the throttling point a gas pressure prevails at which the diffusion pump is still fully operable. In particular, the method can be carried out whereby the gas flow through the throttling point is arranged, with the diffusion pump running, to provide a gas pressure in the vessel at least ten times higher than that of the gas at the intake side of the diffusion pump.

In addition, the correct adjustment of the throttle device can also be calculated. The pressure of the gas on both sides of the throttling device as well as the dimensions of the throttle device can be measured and the flow velocity of the gas determined. Similarly, the diffusion velocity of the propellant vapor molecules in the stream of the gas can be determined on the basis of known formulas.

A method as set forth above has proved satisfactory particularly for the degassing of ultra-high vacuum receivers.

Further, the invention concerns an apparatus for desorbing extraneous vapor molecules from the inner wall surface of a vessel. Inlet means are provided, preferably at the upper end of the vessel, for supplying a purging gas into the vessel, the gas being characterized in that it has only a small tendency to be sorbed into the wall of the vessel. At the lower end of the vessel a diffusion pump is provided for withdrawing the gas through a passageway connected to the vessel. An adjustable throttle device is located in the passageway for regulating the flow of gas to the pump, by suitable adjustment of the throttle device the gas pressure within the vessel is maintained at a considerably higher level than at the intake of the diffusion pump. The pressure and flow velocity relationship permits the gas to purge the inner walls of the vessel of extraneous vapor molecules without any backflow of the propellant vapor molecules through the throttle device into the vessel.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Brief description of the drawing

The drawing discloses a vertical sectional view of a vessel and auxiliary equipment arranged to carry out the method of the present invention.

Detailed description of the invention

In the drawing a vessel 1 is shown in communication with a sorption pump 2 located in chamber 2a at the lower end of the vessel. Below the sorption pump 2 a closure wall 20 is provided having an opening 21 communicating with a diffusion pump 3 positioned below the vessel 1. A water coolant propellant trap 4 is located between the wall 20 and the diffusion pump 3. Arranged below the opening 21 in the wall 20 is a throttle device or plate 5 provided with an arm 7 connected to a handle 6 which is positioned at the exterior of the apparatus for adjustably positioning the plate 5 for regulating flow between the vessel and the diffusion pump 3. The throttle device may be designed to permit a certain flow between the vessel 1 and the diffusion pump 3 even when it is completely closed, and its adjustable construction permits the disposition of the closure member in any number of intermediate positions between the fully opened and closed positions.

The propellant trap 4 is a hollow chamber construction having an inlet line 8 and an outlet line 9 for flowing cooling water through the trap. Disposed below the trap is a jet cap 10 located on the topmost nozzle 10a of the diffusion pump. A shield member 11 is located above the jet cap 10 and is cooled by and dependently supported by a heat conducting connection 11a attached to the propellant trap.

In the chamber 2a above the wall 20 the sorption or evaporation getter pump 2 is schematically shown comprising a pair of cooled spaced sorption members 12 and 13. Each sorption member comprises a flat wall 12a, 13a and a curved wall 12b, 13b providing a chamber 12c, 13c for the passage of cooling fluid through the members. Disposed between the sorption members 12, 13 are a plurality of electric heating members 14 which consists of getter metal or carry the metal in the form of thin wires. During operation the getter metal either evaporates continuously or at desired intervals of time, and precipitates onto the sorption surfaces formed by the flat walls 12a, 13a. A deep-cooled liquefied gas is used as the coolant for the sorption members 12, 13 and is supplied to and withdrawn from them by means of a double conduit member 15.

At the upper end of the vessel an inlet line 16a having a valve 16 supplies the purging or auxiliary gas to the vessel from a storage tank 17.

In removing extraneous molecules from the inner wall of the vessel 1 the following procedure is employed: initially, the vessel is brought to a vacuum of $10^{-6}$ torr. At the same time, or following the establishment of the vacuum, the vessel is heated to a temperature of between 200 and 350° C. by a furnace (not shown) placed over it and maintained at the desired temperature whereby any extraneous molecules adhering to the inner wall of the vessel are desorbed. During the heating process an auxiliary gas, such as argon, is introduced into the vessel through the inlet line 16a and the throttle device 5 is closed to the extent that the pressure of the gas within the vessel is established at $10^{-1}$ torr, but the pressure of the gas at the intake side of the diffusion pump is at $10^{-3}$ torr, and a pressure difference exists between the opposite sides of the throttle device of about 100:1. After approximately one hour the vessel is degassed to the extent that, after it is cooled and the throttling device is opened, an ultra-high vacuum is achieved without any sorption of propellant vapor molecules on the inner wall of the receiver.

What is claimed is:

1. An apparatus for desorbing extraneous molecules from a wall surface comprising a vessel having an inner wall, means for supplying gas into the vessel, a diffusion pump, means forming a passageway connecting said diffusion pump to said vessel for the flow of gas therethrough, an adjustable throttle device disposed in said passageway for regulating the flow of gas from said vessel to said diffusion pump whereby the gas is withdrawn from said vessel by said diffusion pump and by adjusting the throttle device the pressure within said vessel is maintained at a higher pressure than at the intake to said diffusion pump, wherein said throttle device comprises a plate member disposed across the opening through said passageway, an arm secured to said plate member and means secured to said arm for movably displacing said plate member relative to the opening in said passageway.

2. An apparatus, as set forth in claim 1, wherein said plate member of said throttle device is movably positionable between a fully opened position and a closed position, and in the closed position said plate being arranged to afford a diffusion opening between said vessel and said diffusion pump.

3. An apparatus, as set forth in claim 1, wherein said means secured to said arm for movably displacing said plate member comprises a handle secured to the opposite end of said arm from its point of attachment to said plate member for manually displacing said plate member between its fully opened and closed positions.

4. An apparatus as set forth in claim 1, wherein a fluid cooled propellant vapor is positioned between said diffusion pump and throttle device.

5. An apparatus as set forth in claim 4, wherein a sorption pump is disposed between said vessel and said throttle device.

6. An apparatus as set forth in claim 5, wherein said sorption pump comprises a pair of spaced cooled sorption surfaces, electric heating surfaces including getter metal disposed between said sorption surfaces.

7. An apparatus as set forth in claim 6 wherein each of said sorption surfaces includes wall means forming a chamber, and means for flowing cooling fluid through said chambers.

8. An apparatus as set forth in claim 7, wherein said diffusion pump comprises a topmost nozzle directed toward said vapor trap, a cap positioned on said nozzle, a shield member spaced between said cap and propellant trap, and a heat conduction member attached to said trap and dependently supporting said shield.

References Cited
UNITED STATES PATENTS

| | | | |
|---|---|---|---|
| 3,018,561 | 1/1962 | Wells | 34—92 |
| 3,081,068 | 3/1963 | Milleron | 62—55.5 |
| 3,095,494 | 6/1963 | Denton | 34—92 |
| 3,103,108 | 9/1963 | Santeles | 62—55.5 |
| 3,168,819 | 2/1965 | Santeles | 62—55.5 |
| 3,262,212 | 7/1966 | De Buhr | 34—15 |

WILLIAM J. WYE, Primary Examiner

U.S. Cl. X.R.

34—51, 92; 62—55.5